United States Patent
Feiten et al.

(10) Patent No.: US 10,671,035 B2
(45) Date of Patent: Jun. 2, 2020

(54) CONTROL DEVICE FOR A PRODUCTION MODULE, PRODUCTION MODULE HAVING A CONTROL DEVICE, AND METHOD FOR OPERATING THE CONTROL DEVICE

(71) Applicant: SIEMENS AKTIENGESELLSCHAFT, München (DE)

(72) Inventors: Wendelin Feiten, Neubiberg (DE); Harald Held, Bockhorn (DE); Philipp Emanuel Stelzig, München (DE); Kai Wurm, München (DE)

(73) Assignee: Siemens Aktiengesellshaft (DE)

( * ) Notice: Subject to any disclaimer, the term of this patent is extended or adjusted under 35 U.S.C. 154(b) by 38 days.

(21) Appl. No.: 15/738,592

(22) PCT Filed: Jun. 13, 2016

(86) PCT No.: PCT/EP2016/063437
§ 371 (c)(1),
(2) Date: Dec. 21, 2017

(87) PCT Pub. No.: WO2017/001173
PCT Pub. Date: Jan. 5, 2017

(65) Prior Publication Data
US 2018/0210411 A1    Jul. 26, 2018

(30) Foreign Application Priority Data
Jul. 1, 2015   (DE) .................. 10 2015 212 264

(51) Int. Cl.
*G06F 19/00*     (2018.01)
*G05B 19/04*     (2006.01)
(Continued)

(52) U.S. Cl.
CPC ......... *G05B 19/0405* (2013.01); *G05B 13/02* (2013.01); *G05B 13/0205* (2013.01);
(Continued)

(58) Field of Classification Search
CPC   G05B 13/02; G05B 13/0205; G05B 19/0405;
G05B 19/0421; G05B 19/048;
(Continued)

(56) References Cited

U.S. PATENT DOCUMENTS 3,891,836 A    6/1975  Lee
6,272,391 B1*  8/2001  Maturana ......... G05B 19/41865
                                               700/103
(Continued)

FOREIGN PATENT DOCUMENTS

CN           1637738 A      7/2005
CN        101007471 A       8/2007
(Continued)

OTHER PUBLICATIONS

Stokic, D. et al: "Self-Learning Embedded Services for Integration of Complex, Flexible Production Systems"; IECON 2011—37th Annual Conference on IEEE Industrial Electronics Society; 2011; pp. 415-420; DOI: 10.1109/IECON.2011.6119346; 2011.
(Continued)

*Primary Examiner* — Zhipeng Wang
(74) *Attorney, Agent, or Firm* — Schmeiser, Olsen & Watts LLP

(57) ABSTRACT

Provided is a control device for a production module having a data memory for storing operational settings of production modules and restrictions, which must be complied with by at least some of the operational settings. A settings management module is used to determine the external operational setting of an adjacent production module on which a local operational setting of the production module is dependent on
(Continued)

Figure 1:
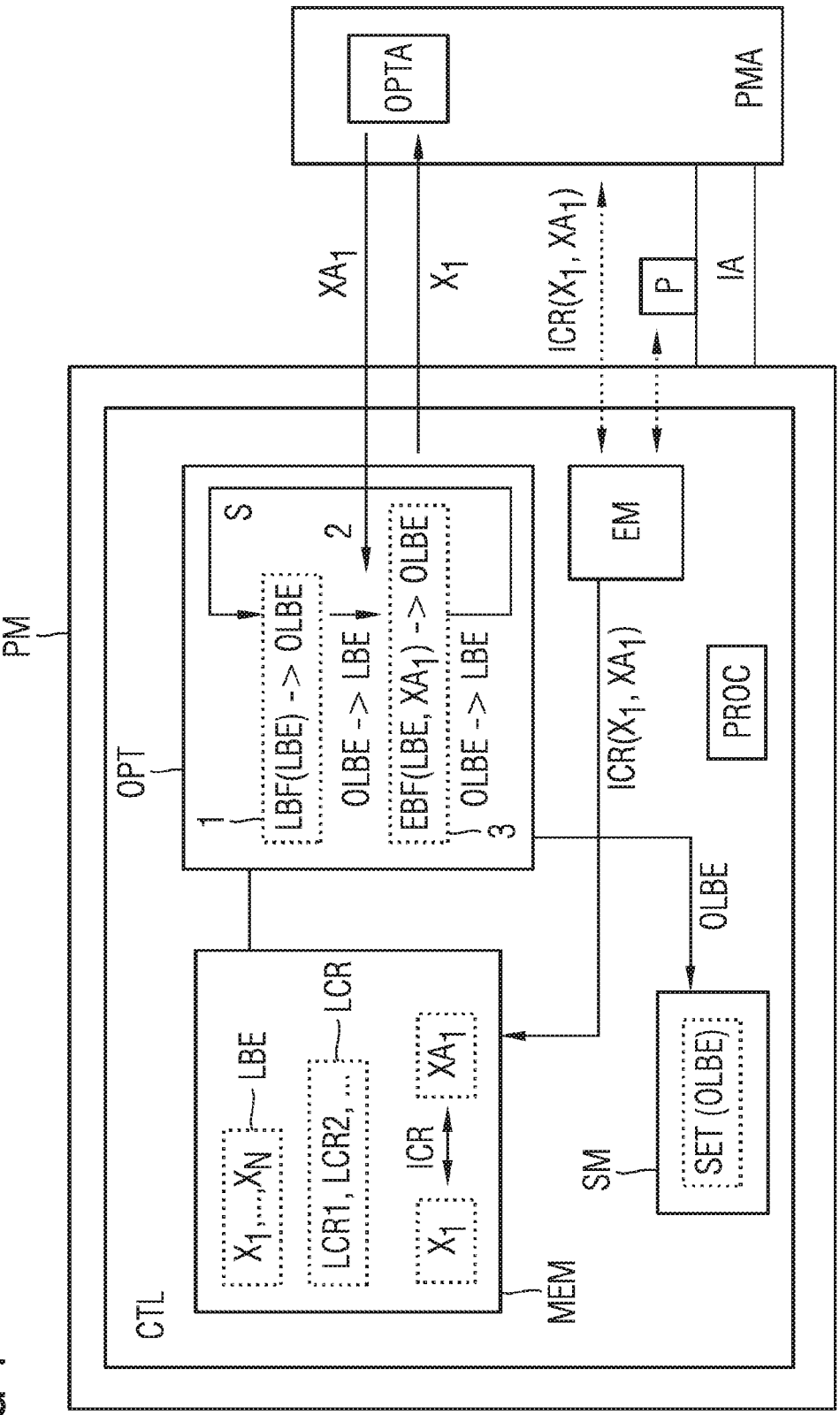

the basis of a common restriction. An optimization module is also provided and has a local assessment function, which assesses the local operational setting, and a further assessment function which assesses noncompliance with the common restriction.

17 Claims, 2 Drawing Sheets

(51) Int. Cl.
  *G05B 13/02* (2006.01)
  *G05B 19/042* (2006.01)
  *G05B 19/418* (2006.01)
  *G05B 19/048* (2006.01)

(52) U.S. Cl.
  CPC ....... *G05B 19/048* (2013.01); *G05B 19/0421* (2013.01); *G05B 19/41865* (2013.01); *G05B 2219/31076* (2013.01); *G05B 2219/31206* (2013.01); *G05B 2219/32015* (2013.01); *G05B 2219/32053* (2013.01); *G05B 2219/33273* (2013.01); *Y02P 90/20* (2015.11)

(58) Field of Classification Search
  CPC .... G05B 19/41865; G05B 2219/31076; G05B 2219/31206; G05B 2219/32015; G05B 2219/32053; G05B 2219/33273; Y02P 90/20
  See application file for complete search history.

(56) References Cited

U.S. PATENT DOCUMENTS

| | | | |
|---|---|---|---|
| 6,427,221 B1 * | 7/2002 | Maturana | G05B 19/41865 700/100 |
| 6,647,300 B1 * | 11/2003 | Balasubramanian | G05B 19/41865 700/4 |
| 10,088,837 B1 | 10/2018 | Strain et al. | |
| 2002/0138673 A1 | 9/2002 | Schaffer et al. | |
| 2004/0010339 A1 | 1/2004 | Mountz | |
| 2005/0010388 A1 | 1/2005 | Bagchi et al. | |
| 2006/0227350 A1 | 10/2006 | Crawford et al. | |
| 2007/0162601 A1 | 7/2007 | Pendarakis et al. | |
| 2009/0105855 A1 | 4/2009 | Mehta | |
| 2009/0319070 A1 | 12/2009 | Morningred | |
| 2012/0029656 A1 | 2/2012 | Colombo et al. | |
| 2014/0024302 A1 | 1/2014 | Aandewiel et al. | |
| 2014/0128996 A1 | 5/2014 | Sayyarrodsari et al. | |
| 2014/0309793 A1 | 10/2014 | Cheng et al. | |
| 2018/0210411 A1 | 7/2018 | Feiten et al. | |

FOREIGN PATENT DOCUMENTS

| | | |
|---|---|---|
| CN | 101126693 A | 2/2008 |
| CN | 101356502 A | 1/2009 |
| CN | 101533273 A | 9/2009 |
| CN | 102124484 A | 7/2011 |
| CN | 103535424 A | 1/2014 |
| CN | 103809438 A | 5/2014 |
| CN | 104116129 A | 10/2014 |
| CN | 104444360 A | 3/2015 |
| DE | 102008037446 A1 | 5/2010 |
| JP | H0283702 A | 3/1990 |
| JP | H0944471 A | 2/1997 |
| JP | H09244727 A | 9/1997 |
| JP | 2001273022 A | 10/2001 |
| JP | 2002116816 A | 4/2002 |
| JP | 2002283154 A | 10/2002 |
| JP | 2002367875 A | 12/2002 |
| WO | 0019350 A1 | 4/2000 |
| WO | WO 2005062145 A1 | 7/2005 |
| WO | WO 2017000173 A1 | 1/2017 |

OTHER PUBLICATIONS

International Search Report dated Jul. 19, 2016 corresponding to PCT International Application No. PCT/EP2016/063437.
Japanese Office Action for Application No. 2017-564116, dated Sep. 4, 2018.
Japanese Office Action dated Jun. 12, 2018 for Application No. 2017-564116.
Non-Final Office Action for U.S. Appl. No. 15/572,990 dated Nov. 29, 2018.
Final Office Action for U.S. Appl. No. 15/572,990 dated May 15, 2019.
Advisory Action for U.S. Appl. No. 15/572,990 dated Aug. 2, 2019.
Non-English Chinese Office Action for application No. 201580079852.7 dated Jun. 5, 2019.
Non-English Chinese Office Action dated Mar. 20, 2020 for Application No. 201680038976.5.

* cited by examiner

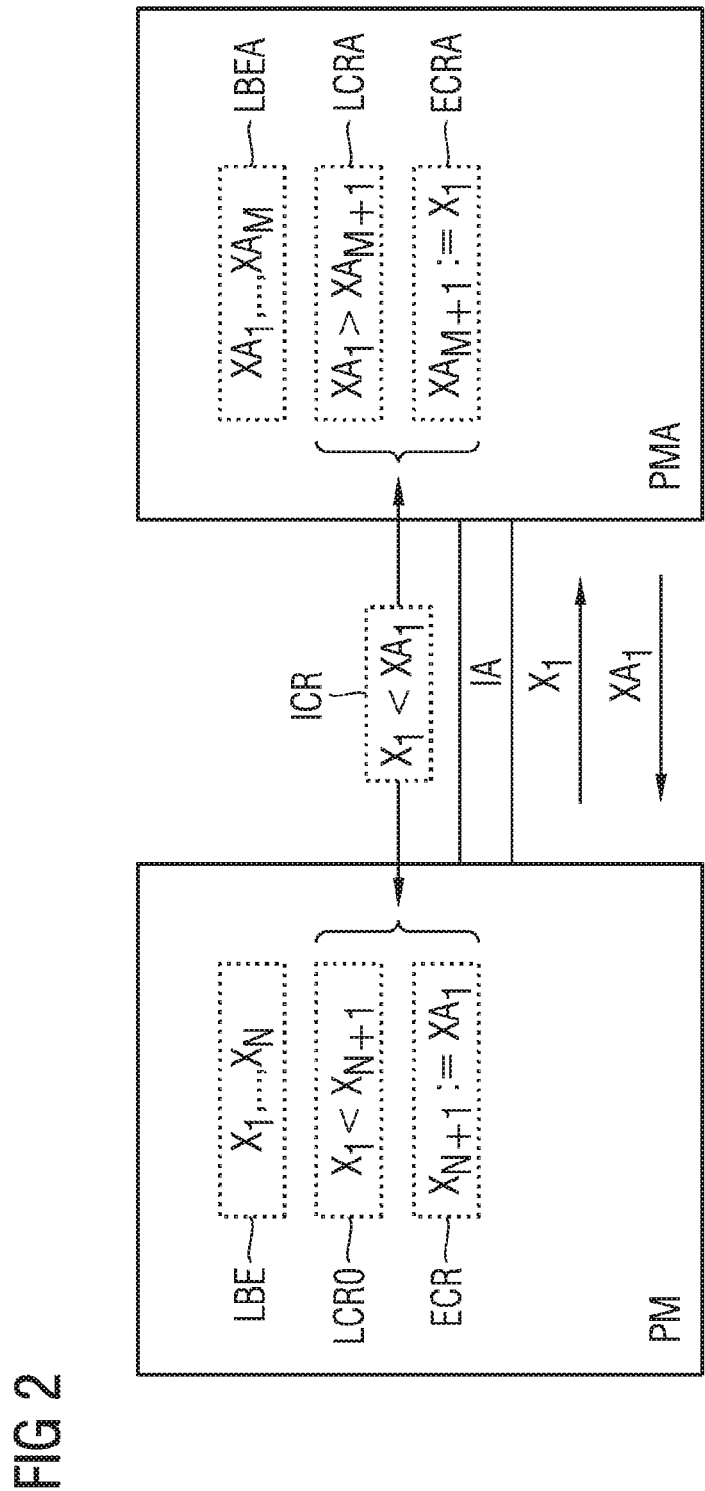

CONTROL DEVICE FOR A PRODUCTION MODULE, PRODUCTION MODULE HAVING A CONTROL DEVICE, AND METHOD FOR OPERATING THE CONTROL DEVICE

CROSS-REFERENCE TO RELATED APPLICATIONS

This application claims priority to PCT Application No. PCT/EP2016/063437, having a filing date of Jun. 13, 2016, based on German Application No. 10 2015 212 264.6, having a filing date of Jul. 1, 2015, the entire contents both of which are hereby incorporated by reference.

FIELD OF TECHNOLOGY

Modern production systems for producing or machining technical products generally have a multiplicity of specific interacting production modules and are becoming increasingly more complex. A multiplicity of machining, production or handling steps generally need to be carried out on a product to be produced or machined, for which purpose a multiplicity of production modules specialized for this purpose, for example robots, CNC machines, 3-D printers, reactors, burners, heating systems or conveyor belts, are provided in the production system. The specific functionalities of the production modules are also referred to as production services.

BACKGROUND

The production modules are adapted to a specific production environment and/or to specific products by means of operational settings, that is to say settings of their operating parameters. In this case, the operational settings are generally subject to a multiplicity of restrictions which may be due to the design or may result from interaction between a production module and a product or another production module. In particular, operational settings of different production modules which have not been matched may result in conflicts of settings.

In addition, there may be more or less favorable operational settings with regard to a purpose or a performance of the production in a region permitted by the restrictions. For example, although a high processing temperature can shorten a machining period, it can also increase the energy consumption. Accordingly, although faster transport of a product or faster transfer of a product can shorten a production period, it can increase the risk of allowing the product to fall.

Accordingly, it is often the aim to determine operational settings for the production modules of a production system which comply with predefined restrictions and are overall as favorable as possible for the production system with regard to predefinable criteria or at least form an acceptable approximation to an optimum setting.

It is known practice to centrally manage the operational settings of production modules in the production system. In practice, suitable optimized operational settings which avoid conflict are frequently manually determined in this case with the cooperation of experienced fitters.

However, a change, a failure, a replacement or an addition of a production module in the production system or else changes caused by the product often result in the optimal values of some operational settings shifting, new or changed restrictions being added and/or existing restrictions being canceled. Such changes of restrictions may result in conflicts of different operational settings, in particular. If such a conflict is not immediately resolved, this may result in downtimes for the production system. In addition, a shift in the optimal values of operational settings may result in unfavorable production conditions.

SUMMARY

An aspect relates to a control device for a production module, a production module and a method for operating the control device which can flexibly react to changes in the production system.

Embodiments of invention provide a control device for a production module for machining or handling a product in a production system having a multiplicity of production modules, a production module and a method for operating the control device.

In this case, a product may be, for example, a workpiece or any desired other product in different phases of a production, machining or processing process and, in particular, also a starting product, an intermediate product or an end product. The production module may be, in particular, an apparatus which contributes to the production, machining, processing and/or handling of a product in a production system and has a specific functionality, for example a robot, a CNC machine, a 3-D printer, a reactor, a burner, a heating system, a conveyor belt or another transport module.

The control device according to embodiments of the invention has a data memory for storing operational settings of the production modules and restrictions which must be complied with by at least some of the operational settings. Such restrictions are often also referred to as constraints. Provision is also made of a settings management module for determining the external operational setting of an adjacent production module on which a local operational setting of the production module is dependent on account of a common restriction. The control device also has an optimization module having a local assessment function, which assesses the local operational setting, and having a further assessment function, which assesses non-compliance with the common restriction. The optimization module is set up to determine an optimized local operational setting by optimizing the local assessment function, reading in the determined external operational setting, and optimizing the further assessment function on the basis of the external operational setting which has been read in. The term optimization is also intended here to include the situation in which the respective variable to be optimized approaches an optimum. The control device also has a control module for setting the optimized local operational setting in the production module.

The production module according to embodiments of the invention comprises the control device according to embodiments of the invention.

The method according to embodiments of the invention relates to the method steps to be carried out by the control device according to embodiments of the invention.

An important advantage of embodiments of the invention can be seen in the fact that operational settings which both comply with restrictions of the production system and are optimized with regard to predefined assessment functions can each be locally determined by a respective production module. Only local communication between adjacent production modules is required for this purpose. In particular, in the event of changes in the production system, for example addition or removal of another production module, a respective production module can locally determine operational settings optimized for the changed production system in cooperation with adjacent production modules. Central management is not required for this purpose in many cases. This often makes it possible to considerably reduce an outlay for setting up or changing the production system.

The optimization module can preferably be set up to repeat the optimization of the local assessment function, the reading-in of the determined external operational setting and the optimization of the further assessment function in a loop comprising these steps. A local abort criterion can be checked during a respective loop pass in order to leave the loop on account of the abort criterion being satisfied. In this case, the abort criterion may comprise, in particular, a threshold value for the non-compliance with the common restriction. This makes it possible to alternately locally optimize operational settings and reduce a measure for the non-compliance with common restrictions during a respective loop pass. This gradual optimization method is generally convergent and results in operational settings which both comply with common restrictions and are optimized with respect to a predefinable criterion.

The optimization module may also be set up to forward the optimized local operational setting to the adjacent production module. The forwarding can be carried out as an additional step within the loop in order to thus respectively forward a current partially optimized operational setting.

In particular, the optimization module may be set up to determine the optimized local operational setting in a parallel manner with a corresponding determination of local operational settings by the adjacent production module. In this case, local operational settings of a current optimization phase, in particular current partially optimized operational settings, can be continuously interchanged with the adjacent production module. This makes it possible to optimize the operational settings of a multiplicity of production modules in a decentralized manner by means of local communication between adjacent production modules.

The data memory may preferably be set up to store a respective operational setting or restriction with an identifier for identifying this operational setting or restriction and with a value indication, a region indication and/or a comparison indication for indicating this operational setting or restriction.

According to one advantageous embodiment, the settings management module may be set up to specifically record restrictions caused by interaction of the production module with a product and/or with an adjacent production module and to store them as restrictions caused by interaction in the data memory.

According to one advantageous development of embodiments of the invention, the settings management module may be set up to dynamically detect a product and/or an adjacent production module, to generate an item of change information on account of such detection, and to transmit the change information to the optimization module and/or to an adjacent production module.

In this case, the settings management module may be set up, on account of the detection, to initiate recording of restrictions caused by interaction of the production module with the product and/or with the adjacent production module.

Accordingly, the optimization module may be set up to optimize the local assessment function, read in the determined external operational setting and/or optimize the further assessment function as a result of receiving an item of change information.

In this manner, the production module can automatically react to changes in products or in adjacent production modules and can newly optimize the operational settings in response to the changed conditions. Manual reconfiguration can then be dispensed with in many cases.

Furthermore, the local assessment function and the further assessment function can be implemented by means of a common assessment function. The latter can then be called with a variable weight for assessing the non-compliance with the common restriction. This allows simplified and more flexible implementation in many cases.

In particular, the optimization module may be set up to successively optimize the further assessment function with an increasing weight for assessing the non-compliance with the common restriction. This generally makes it possible to achieve the situation in which the common restriction is gradually complied with in a more accurate manner.

BRIEF DESCRIPTION

Some of the embodiments will be described in detail, with references to the following figures, wherein like designations denote like members, wherein:

FIG. 1 shows a production module having a control device according to embodiments of the invention in interaction with an adjacent production module; and FIG. 2 shows adjacent production modules when comparing operational settings and restrictions caused by interaction.

DETAILED DESCRIPTION

FIG. 1 illustrates a production module PM having a control device CTL according to embodiments of the invention in interaction with an adjacent production module PMA. The production modules PM and PMA are part of a production system and are used to machine or handle a product P in the production system. Such a production system, for example a manufacturing plant for producing, machining or processing workpieces or other products, generally has a multiplicity of interacting production modules with a specific functionality. The product P may be a workpiece or generally any desired product, in particular a physical product, in various phases of a manufacturing, machining or processing process, in particular also a starting product, an intermediate product or an end product. The production modules PM and PMA adjacent to one another may be spatially or logically adjacent in the production system. In particular, the production modules PM and PMA can also interact with other production modules of the production system and, in this sense, may also be adjacent to other production modules.

The production modules PM and PMA may each be an apparatus which contributes to the production, machining, processing and/or handling of the product in the production system and has a specific functionality, for example may each be a robot, a CNC machine, a 3-D printer, a reactor, a burner, a heating system or a conveyor belt or another transport module. In particular, a respective production module PM or PMA may be a so-called cyber physical module (CPM) or a cyber physical production module (CPPM).

The production module PM interacts with the adjacent production module PMA in an interaction region IA. In this case, a respective interaction may also extend to products, here the product P, in the interaction region IA. The interaction region IA is a spatial or logical region which is accessible to a plurality of production modules or can be influenced by a plurality of production modules, for example a transfer region between a robot arm and a conveyor belt or between two robot arms. In such interaction regions, here IA, it is generally necessary to match movements or other operational settings of the production modules interacting there. In particular, a movement range or a range of another operational setting of a production module is generally restricted by the interaction with an adjacent production module. Such restrictions which initially occur locally can often also affect production modules of the production system which are not directly adjacent if a production module frequently interacts with a plurality of adjacent production modules. An interaction with a first of the adjacent production modules can therefore be subject to restrictions which result from restrictions of an interaction with a second of the adjacent production modules. The aim is therefore to determine, on the basis of a set of individual restrictions, a set of operational settings which, as far as possible, comply with all restrictions of production modules of the production system. The aim is also to determine the operational settings within the limits predefined by the restrictions in such a manner that one or more effects of these operational settings are improved with respect to predefined criteria. Such criteria may relate, for example, to a performance of the production system or a consumption of resources.

An operational setting in the above sense can be understood as meaning a setting of operating parameters and/or operating properties of a production module, in particular a setting of physical parameters, control variables, regulation variables and/or process variables. Such operating properties or operating parameters may be, for example, a speed, acceleration, a position and/or an orientation of a product or of a handling apparatus of a production module. Operating parameters, for example dimensions, pressure, temperature etc., of an interaction region or voltage, current, rotational speed and/or consumption of resources of subsystems of a production module can also be interpreted as operational settings. Such operational settings are preferably each managed by a production module as a data set with a value indication and an associated identifier which identifies the operational setting.

A restriction in the above sense is an operational restriction which must be complied with for a respective operational setting, for example a value indication, a region indication or a comparison indication for physical or logical variables or a physical or logical secondary condition. Such a restriction can be represented or modeled, for example, by means of an equation or an inequation. For example, a permissible speed range or a speed value can be predefined as a restriction for an operational setting of a speed. In addition, it may be required as a restriction, for example, that a speed of a robot arm and a speed of a conveyor belt are substantially the same or differ at most by a tolerance value when transferring a product.

Restrictions can generally be distinguished with respect to their cause. On the one hand, there are restrictions caused by a respective production module itself. These may be, in particular, restrictions caused by the design, for example minimum speed or maximum speed of a conveyor belt.

On the other hand, there are restrictions caused by interaction of a respective production module with a respective product. These are generally specific to a product and are contained in a model of a production process for the product. For example, when transporting a bottle which has already been filled but has not yet been closed, it should be ensured that the bottle is kept substantially vertical and that an upper limit for its acceleration is complied with.

In addition, there are restrictions which are caused by interaction between two or more production modules. For example, when transferring products between two production modules, the speeds of the handling apparatuses in the delivering production module and in the receiving production module should generally be substantially the same.

There are also restrictions which are caused by the production system or by an environment of the production module, for example an upper limit for a power consumption of the entire production system.

In so far as the operational settings of adjacent production modules influence one another, the restrictions of adjacent production modules are linked to one another and therefore influence one another. The restrictions of a production module can therefore also indirectly affect the restrictions of production modules which are not directly adjacent, potentially over the entire production system. Such restrictions are preferably managed by the production module as data sets containing identifiers for identifying the operational settings affected and the underlying secondary conditions. The data sets may comprise, for example, equations or inequations with value indications, region indications and/or comparison indications for operational settings or other physical or logical variables. As a result, a respective restriction, in particular, is assigned to the operational setting(s) restricted thereby.

In this context, a common restriction is understood as meaning a restriction which links various operational settings, in particular of various production modules, for example in the form of an equation or inequation such as $X_1=Y_2$ or $X_1<Y_2$, which is intended to mean that an operational setting $X_1$ is intended to be equal to or less than an operational setting $Y_2$.

In order to assess compliance with a restriction, a numerical measure is preferably predefined for the non-compliance with the restriction. In the case of a restriction $X_1=Y_2$ which requires two operational settings to be the same, the square of the difference between the two operational settings $(X_1-Y_2)^2$, for example, can be used as the numerical measure for the non-compliance with this restriction. Alternatively or additionally, an absolute value of the difference can also be used.

In the present exemplary embodiment, the production module PMA1 and other production modules of the production system also have a control device (not illustrated) corresponding to the control device CTL of the production module PM.

In order to carry out all method steps according to embodiments of the invention, the control device CTL has a processor PROC.

The control device CTL also has a data memory MEM for storing operational settings of the production modules, here PM and PMA, and for storing restrictions which must be complied with by at least some of these operational settings.

In the present exemplary embodiment, the data memory MEM stores a set LBE of local operational settings $X_1, \ldots, X_N$ of the production module PM. A set LCR of local restrictions LCR1, LCR2, ... is also stored. The local restrictions LCR1, LCR2, ... relate to restrictions caused by the production module PM itself, for example restrictions caused by the design. The data memory MEM also stores a restriction ICR caused by interaction. This restriction relates the local operational setting $X_1$ of the production module PM to an operational setting $XA_1$ of the production module PMA, for example in the form of a secondary condition such as $X_1<XA_1$. In this case, $X_1$ may denote a speed of a conveyor belt of the production module PM and $XA_1$ may denote a speed of a robot arm of the production module PMA, for example. In this case, the above secondary condition means that the speed of the conveyor belt is intended to be less than the speed of the robot arm.

Based on the production module PMA, the operational setting $XA_1$ is a local operational setting of this production module. Such local operational settings of the production module PMA are referred to as external operational settings below in relation to the production module PM. In so far as the restriction ICR caused by interaction relates to various operational settings of various production modules, it can be interpreted as the common restriction of the operational settings $X_1$ and $XA_1$ in the above sense.

In so far as restrictions of various production modules may in turn be dependent on one another, the data memory MEM may also contain, in addition to restrictions regarding directly adjacent production modules, restrictions for indirectly adjacent production modules, that is to say also non-local or global restrictions, in particular.

The control device CTL also has a settings management module EM for checking whether and which external operational settings of an adjacent production module, here PMA, are dependent on local operational settings of the production module PM via a common restriction, that is to say relate to the same common restriction. For this purpose, the settings management module EM—as indicated by dotted double-headed arrows in FIG. 1—dynamically detects the adjacent production module PMA and the product P in the interaction region IA. In connection with the detection of the adjacent production module PMA, the settings management module EM determines that the restriction ICR which is caused by interaction and links the local operational setting $X_1$ to the external operational setting $XA_1$ exists. Consequently, the restriction ICR $(X_1, XA_1)$ caused by interaction is recorded by the settings management module EM and is stored as a restriction data set in the data memory MEM.

The control device CTL also has an optimization module OPT which is coupled to the data memory MEM. Said optimization module implements a local assessment function LBF, which assesses the local operational settings LBE, and a further assessment function EBF which assesses non-compliance with a common restriction, here ICR. The optimization module OPT is used to determine optimized local operational settings OLBE which both largely comply with local and common restrictions and are optimized with regard to predefined criteria within the scope of these restrictions.

The local assessment function LBF assesses the local operational settings LBE according to local criteria, that is to say criteria relating to the production module PM. These local criteria comprise, in particular, the local restrictions LCR. The dependence of the local assessment function LBF on the local restrictions LCR is not illustrated in FIG. 1 for reasons of clarity.

The further assessment function EBF assesses, in particular, the non-compliance with the restriction ICR caused by interaction as a function of the local operational settings LBE and the external operational setting $XA_1$. The existing dependence of the further assessment function EBF on the restriction ICR caused by interaction and possibly on the local restrictions LCR is not illustrated in FIG. 1 for reasons of clarity. In order to assess the non-compliance with the restriction ICR caused by interaction, a square of the deviation of the local operational setting $X_1$ from the external operational setting $XA_1$, for example, can be included in the further assessment function EBF as a summand.

Such assessment functions, here LBF and EBF, are often also referred to as cost functions within the scope of optimization methods.

The assessment functions LBF and EBF are optimized by means of known optimization methods. Optimization of an assessment function or of the operational settings included therein is understood as meaning the fact that the operational settings are determined in such a manner that one or more effects of these operational settings are improved with regard to predefined criteria, that is to say these effects approach a particularly favorable optimum with regard to predefined metrics. Such metrics are implemented by the assessment functions which are dependent on the operational settings to be optimized. The operational settings to be optimized are then varied such that the assessment function dependent thereon is optimized, that is to say this assessment function becomes smaller or as small as possible or larger or as large as possible. A multiplicity of solution methods, for example minimization methods, simplex methods, gradient methods etc., are known for the purpose of solving such optimization problems. Restrictions in the form of secondary conditions may be taken into account in many optimization methods of this type by means of so-called Lagrange multipliers.

The production module PMA has an optimization module OPTA corresponding to the optimization module OPT.

In order to optimize the local operational setting LBE, the optimization module OPT carries out a loop S using method steps 1, 2 and 3. In method step 1, the local assessment function LBF is optimized by means of standard optimization methods, with the result that the local assessment function LBF becomes minimal, for example. As already mentioned above, the local restrictions LCR may be taken into account by means of Lagrange multipliers. The locally optimized operational settings OLBE result as the result of the optimization of the local assessment function LBF. These locally optimized operational settings are stored in the data memory MEM as local operational settings LBE, that is to say the local operational settings LBE stored there are replaced with the operational settings OLBE optimized in method step 1 and are therefore updated.

In method step 2, a current value of the external operational setting $XA_1$, which comes from the production module PMA, is read in. This is preferably a current value optimized or partially optimized in a corresponding optimization method of the production module PMA.

In method step 3, the further assessment function EBF is optimized on the basis of the external operational setting $XA_1$ which has been read in and taking into account both the local restrictions LCR and the restriction ICR caused by interaction. The restriction ICR caused by interaction is used as an essential, main or sole optimization criterion in the further assessment function EBF. During this optimization too, it is possible to use standard optimization methods in which the restriction ICR caused by interaction and/or the local restrictions LCR is/are taken into account by means of Lagrange multipliers. Optimized local operational settings OLBE again result from the optimization in method step 3 and are used to update the local operational settings LBE in the data memory MEM. The local operational settings OLBE optimized in method step 3 comply with the restriction ICR caused by interaction in a considerably improved manner than before the optimization. As part of method step 3, the currently optimized operational setting $X_1$ from the optimized local operational settings OLBE is forwarded to the optimization module OPTA of the production module PMA.

As part of method step 3, an abort criterion for the loop S is also checked, for example a value for the non-compliance with the restriction ICR caused by interaction according to the assessment function EBF and/or a value for a distance between the local operational settings LBE and an optimum according to the local assessment function LBF. If the abort criterion is not satisfied, for example by means of comparison with a tolerance threshold, a new pass of the loop S is initiated.

The local assessment function LBF and the further assessment function EBF may preferably be implemented by means of a common assessment function, the different optimization goals of the assessment functions LBF and EBF being able to be implemented by means of a call with different optimization weights. In particular, a variable weight for assessing the non-compliance with the common restriction, here ICR, may be provided. The common assessment function may be called as the local assessment function LBF if this variable weight is set substantially to 0 and may be called as the further assessment function EBF if the variable weight is increased in a manner corresponding to the purpose. The variable weight may preferably be gradually increased during successive passes of the loop S in order to gradually improve the compliance with the restriction ICR caused by interaction.

As soon as the abort criterion has been satisfied, the loop S is left. After leaving the loop S, the resulting locally optimized operational settings OLBE are transmitted from the optimization module OPT to a control module SM of the control device CTL. The control module SM finally sets the optimized local operational settings OLBE in the production module PM.

FIG. 2 shows the adjacent production modules PM and PMA during a comparison of operational settings and restrictions caused by interaction. In FIG. 2, reference symbols which match reference symbols used in FIG. 1 denote the same object.

In a manner corresponding to the set LBE of local operational settings $X_1, \ldots, X_N$ of the production module PM, a corresponding set LBEA of local operational settings $XA_1, \ldots, XA_N$ of the production module PMA is assigned to the production module PMA. From the point of view of the production module PM, the operational settings LBEA are referred to as external operational settings.

It is assumed, by way of example, that the restriction ICR caused by interaction comprises the secondary condition $X_1 < XA_1$. The restriction ICR caused by interaction relates to the interaction of both production modules PM and PMA and is recorded by mutually corresponding settings management modules (not illustrated in FIG. 2) of both production modules PM and PMA.

On the basis of the recorded restriction ICR caused by interaction, the production module PM generates a new local operational setting $X_{N+1}$ which is managed as the local representation of the external operational setting $XA_1$. In this manner, the secondary condition $X_1 < X_{N+1}$ is generated from the restriction ICR caused by interaction as a purely local restriction LCR0. The local restriction LCR0 is added to the set LCR of local restrictions and in this manner is also included in the optimization of the local assessment function LBF and is therefore taken into account in method step 1 as a local secondary condition.

Furthermore, the production module PM generates an external restriction ECR from the restriction ICR caused by interaction. In this context, external means that a local operational setting, here $X_1$, is linked to an external operational setting, here $XA_1$, here as a secondary condition of the equality of both variables $X_{N+1} := XA_1$. The external restriction ECR is included, as a common restriction of the operational settings $X_{N+1}$ and $XA_1$, in the optimization of the further assessment function EBF and in this manner is taken into account as a secondary condition in method step 3.

In a similar manner, the production module PMA generates a new operational setting $XA_{M+1}$ local to the production module PMA from the restriction ICR caused by interaction and manages this local operational setting as a local representation of the operational setting $X_1$ of the production module PM. Furthermore, a local restriction LCRA with the secondary condition $XA_1 > XA_{M+1}$ and an external restriction ECRA with the secondary condition $XA_{M+1} := X_1$ are generated from the restriction ICR caused by interaction. The production module PMA therefore carries out the same optimization method as the production module PA. The optimization methods in the production module PM and in the production module PMA are preferably carried out in a parallel manner with continuous interchange of the operational settings $X_1$ and $XA_1$ updated in the loop S.

All production modules suitable for this purpose preferably carry out this optimization method at least partially in a parallel manner in the production system, the operational settings affected by common restrictions being interchanged between adjacent production modules.

In this manner, it is generally possible to determine operational settings of the production modules of the production system which comply with all restrictions as far as possible or comply with at least as many restrictions as possible and overall are as favorable as possible. As a result of the local optimizations being carried out by the individual production modules, a sum of the local assessment functions is optimized for the entire production system as an overall assessment function for the production system. For this purpose, communication between production modules may be restricted to communication between adjacent production modules. During this communication, those operational settings of the respectively adjacent production modules via which common restrictions exist are determined by each suitable production module. These operational settings of adjacent production modules are stored in the local data memory and can be interpreted as local operational settings and can accordingly be locally optimized. Although it can be assumed, after such local optimization, that a value of the copied and locally optimized operational setting differs from the original value of this operational setting in the adjacent production module, the equality of the copy and of the original value can be easily generated as an additional secondary condition. An important advantage of the invention results from the fact that the secondary conditions generated in this manner are very simple, whereas more complex secondary conditions can be taken into account by means of purely local optimization.

By virtue of the fact that local variables are alternately optimized and differences between copied and original operational settings are optimized, it is often already possible to find a favorable solution which simultaneously takes into account all restrictions of the operational settings after a few steps. In this case, the reaching of a convergence of the method can also be determined in a decentralized manner.

This decentralized implementation of embodiments of the invention is advantageous in so far as there is generally no need to adapt or configure the optimization methods if production modules are added to or removed from the production system. Another advantage can be seen in redundancy in the calculation and storage of the operational settings. If the locally optimized operational settings are not available in good time in a production module, their values can be transferred from adjacent production modules.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A plurality of control devices, each control device controlling a respective production module for machining or handling a product in a production system having a multiplicity of production modules, each control device comprising:
    a) a data memory for storing operational settings of the multiplicity of production modules and restrictions which must be complied with by at least some of the operational settings,
    b) a processor configured to dynamically detect an adjacent production module, record a restriction caused by interaction of the respective production module with at least one of the product and the adjacent production module, and determine an external operational setting of the adjacent production module on which a local operational setting of the respective production module is dependent on account of a common restriction,
    c) wherein the processor is also configured to implement a local assessment function, which assesses the local operational setting, and having a further assessment function, which assesses non-compliance with the common restriction, set up to determine an optimized local operational setting by:
        optimizing the local assessment function resulting in an updated local operational setting, reading in the determined external operational setting, and
        optimizing the further assessment function on the basis of the external operational setting which has been read in and on the updated local operational setting resulting from the optimization of the local assessment function, and
    d) wherein the processor is also configured to set the optimized local operational setting in the respective production module such that the respective production module is operated in accordance with the optimized local operational setting.

2. The plurality of control devices as claimed in claim 1, wherein the processor is configured
    to repeat the optimization of the local assessment function, the reading-in of the determined external operational setting and the optimization of the further assessment function in a loop comprising these steps,
    to check a local abort criterion during a respective loop pass, and
    to leave the loop on account of the abort criterion being satisfied.

3. The plurality of control devices as claimed in claim 2, wherein the local abort criterion comprises a threshold value for the non-compliance with the common restriction.

4. The plurality of control devices as claimed in claim 1, wherein the processor is configured to forward the optimized local operational setting to the adjacent production module.

5. The plurality of control devices as claimed in claim 1, wherein the processor is configured to determine the optimized local operational setting in a parallel manner with a corresponding determination of local operational settings by the adjacent production module, wherein local operational settings of a current optimization phase are continuously interchanged with the adjacent production module.

6. The plurality of control devices as claimed in claim 1, wherein the data memory is set up to store a respective operational setting or restriction with an identifier for identifying this operational setting or restriction and with at least one of a value indication, a region indication and a comparison indication for indicating this operational setting or restriction.

7. The plurality of control devices as claimed in claim 1, wherein the processor is configured to specifically record restrictions caused by interaction of the respective production module with at least one of a product and with the adjacent production module and to store them as restrictions caused by interaction in the data memory.

8. The plurality of control devices as claimed in claim 1, wherein the processor is configured
    to generate an item of change information on account of such detection, and
    to transmit the change information to the adjacent production module.

9. The plurality of control devices as claimed in claim 8, wherein the processor is configured to optimize the local assessment function, read in the determined external operational setting and/or optimize the further assessment function as a result of receiving an item of change information.

10. The plurality of control devices as claimed in claim 1, wherein the local assessment function and the further assessment function are implemented by means of a common assessment function which can be called with a variable weight for assessing the non-compliance with the common restriction.

11. The plurality of control devices as claimed in claim 1, wherein the processor to successively optimize the further assessment function with an increasing weight for assessing the non-compliance with the common restriction.

12. A plurality of production modules, each respective production module of the plurality of production modules having a respective control device, wherein each control device comprises:
    a) a data memory for storing operational settings of the respective production module and an adjacent production module and restrictions which must be complied with by at least some of the operational settings,
    b) a processor configured to dynamically detect the adjacent production module, record a restriction caused by interaction of the respective production module with at least one of a product and the adjacent production module, and determine an external operational setting of the adjacent production module on which a local operational setting of the respective production module is dependent on account of a common restriction,
    c) wherein the processor is also configured to implement a local assessment function, which assesses the local operational setting, and having a further assessment function, which assesses non-compliance with the common restriction, set up to determine an optimized local operational setting by:
        optimizing the local assessment function resulting in an updated local operational setting,
        reading in the determined external operational setting, and
        optimizing the further assessment function on the basis of the external operational setting which has been read in and on the updated local operational setting resulting from the optimization of the local assessment function, and d) wherein the processor is also configured to set the optimized local operational setting in the respective production module such that the respective production module is operated in accordance with the optimized local operational setting.

13. A method for controlling a plurality of production modules comprising:
   a) storing operational settings of the plurality of production modules and restrictions which must be complied with by at least some of the operational settings,
   b) determining a respective production module, an adjacent production module, and an external operational setting of the adjacent production module on which a local operational setting of the respective production module is dependent on account of a common restriction,
   c) determining an optimized local operational setting on the basis of a local assessment function, which assesses the local operational setting, and a further assessment function, which assesses non-compliance with the common restriction, by:
      optimizing the local assessment function resulting in an updated local operational setting,
      reading in the determined external operational setting, and
      optimizing the further assessment function on the basis of the external operational setting which has been read in and on the updated local operational setting resulting from the optimization of the local assessment function,
   d) setting the optimized local operational setting in the respective production module such that the respective production module is operated in accordance with the optimized local operational setting, and
   e) recording a restriction caused by interaction of the respective production module with at least one of a product and the adjacent production module;
   wherein the method is performed on at least a first control device and a second control device,
   wherein the first control device is associated with a first production module of the plurality of production modules and the second control device is associated with a second production module of the plurality of production modules.

14. A computer program product, comprising a computer readable hardware storage device having computer readable program code stored therein, said program code executable by a processor of a computer system to implement a method for controlling a plurality of production modules, wherein the method comprises:
   a) storing operational settings of the plurality of production modules and restrictions which must be complied with by at least some of the operational settings,
   b) determining a respective production module, an adjacent production module, and an external operational setting of the adjacent production module on which a local operational setting of the respective production module is dependent on account of a common restriction,
   c) determining an optimized local operational setting on the basis of a local assessment function, which assesses the local operational setting, and a further assessment function, which assesses non-compliance with the common restriction, by:
      optimizing the local assessment function resulting in an updated local operational setting,
      reading in the determined external operational setting, and
      optimizing the further assessment function on the basis of the external operational setting which has been read in and on the updated local operational setting resulting from the optimization of the local assessment function,
   d) setting the optimized local operational setting in the respective production module such that the respective production module is operated in accordance with the optimized local operational setting, and
   e) recording a restriction caused by interaction of the respective production module with at least one of a product and the adjacent production module;
   wherein the steps of determining and setting the optimized local operational setting do not require communication from any centralized controller.

15. The plurality of control devices as claimed in claim 1, wherein the processor is configured to set the optimized local operational setting in the respective production module without requiring communication from any centralized controller.

16. The plurality of production modules of claim 12, wherein the processor is configured to set the optimized local operational setting in the respective production module without requiring communication from any centralized controller.

17. The method for controlling a plurality of production modules of claim 13, wherein the method does not require any centralized controller.

* * * * *